United States Patent [19]

Aoki et al.

[11] Patent Number: 5,549,005
[45] Date of Patent: Aug. 27, 1996

[54] VIBRATION TESTING APPARATUS WITH INCREASED RIGIDITY IN STATIC PRESSURE BEARING

[75] Inventors: Hidenao Aoki, Hyogo-ken; Shigehisa Tsutsumi, Osaka; Takehiro Fukushima; Zenji Sakai, both of Hyogo-ken, all of Japan

[73] Assignee: IMV Corporation, Osaka, Japan

[21] Appl. No.: 216,046

[22] Filed: Mar. 22, 1994

[30] Foreign Application Priority Data

Mar. 22, 1993 [JP] Japan .................................. 5-101777

[51] Int. Cl.$^6$ .............................. G01N 29/00; G01M 7/00
[52] U.S. Cl. ................................................. 73/663; 73/665
[58] Field of Search ............................. 73/663, 665, 666, 73/671, 662; 384/12

[56] References Cited

U.S. PATENT DOCUMENTS

| | | | |
|---|---|---|---|
| 4,106,586 | 8/1978 | Stafford | 73/665 |
| 4,783,999 | 11/1988 | Kimball | 73/665 |
| 4,996,881 | 3/1991 | Tauscher et al. | 73/663 |
| 5,083,463 | 1/1992 | Marshall et al. | 73/663 |

*Primary Examiner*—Hezron E. Williams
*Assistant Examiner*—Helen C. Kwok
*Attorney, Agent, or Firm*—Morrison Law Firm

[57] ABSTRACT

A vibration testing apparatus which is minimized in size and capable of being assembled with ease includes a vibrating section (11), a vibration generator (10), and a transmitting section (21) for transmitting vibrations from the vibration generator (10) to the vibrating section. The transmitting section (21) is formed with a pair of opposed parallel pressure-receiving plates (23, 24) that are orthogonal to the direction of vibrations, with the vibrating section (11) interposed between the pressure-receiving plates. The vibrating section (11) is formed with pressure-bearing surfaces (14) in opposed parallel relation to the pair of pressure-receiving plates (23, 24). High pressure fluid is fed into clearances (16), defined between the pressure-receiving plates (23, 24) and the pressure-bearing surfaces (14), to form a static pressure bearing. The pressure-receiving plates (23, 24) are clamped by a connecting member (25) under a load whose value enables the static pressure bearing to function as a spring.

13 Claims, 5 Drawing Sheets

VIBRATION TESTING APPARATUS WITH INCREASED RIGIDITY IN STATIC PRESSURE BEARING

BACKGROUND OF THE INVENTION

1. Field of the Invention

This invention relates to a vibration testing apparatus.

2. Prior Art

A conventional vibration testing apparatus is described, for example, in Japanese Laid-open Patent Publication No. 152,580/1987. In this apparatus, X-direction and Y-direction connection elements in a hollow portion of a vibration section each have a multi-sided cross section. Each connection element has a pressure-receiving surface parallel and opposite an inner surface of the hollow portion. A pair of pressure-receiving plates, parallel and opposite to a pair of pressure-receiving surfaces, cooperate to define a space, which may be used as a static pressure bearing. A plurality of connecting members interconnect the pressure-receiving plates. A vibration generator is connected to the pressure-receiving plates by a stiff transmission member that extends through the vibration section. Oil is pumped into the space under pressure, creating a firm but somewhat resilient connection between the pressure-receiving plates and the transmission member. Thus the static pressure bearings transmit vibration from the vibration generator to the vibration section.

In this prior-art vibration testing apparatus, the connecting members must have sufficient strength to support all the forces that act in the directions of vibrations. Therefore the connecting members must necessarily be very large. Further, since the connecting members in X- and Y-directions must vibrate independently of each other while maintaining the same strength, their arrangement is complicated. A plurality of alternating connecting members must be employed, making assembly of the apparatus difficult.

Another drawback of the prior-art apparatus is that, since it has no means to correct the gap in the static pressure bearing when it changes due to changes in temperature, the static pressure bearing has to be assembled with a large gap distance. Though the large gap distance allows for such changes, it makes increasing the rigidity of the bearing difficult.

OBJECTS AND SUMMARY OF THE INVENTION

An object of the present invention is to provide a vibration testing apparatus that is easy to assemble.

A further object of the present invention is to overcome the drawbacks of the prior art.

Still a further object of the present invention is to provide a vibration testing apparatus capable of increasing the rigidity of the static pressure bearing to improve the vibration characteristics of the apparatus.

Briefly stated, a vibration testing apparatus which is minimized in size and capable of being assembled with ease includes a vibrating section, a vibration generator, and a transmitting section for transmitting vibrations from the vibration generator to the vibrating section. The transmitting section is formed with a pair of opposed parallel pressure-receiving plates that are orthogonal to the direction of vibrations, with the vibrating section interposed between the pressure-receiving plates. The vibrating section is formed with pressure-bearing surfaces in opposed parallel relation to the pair of pressure-receiving plates. High pressure fluid is fed into clearances, defined between the pressure-receiving plates and the pressure-bearing surfaces, to form a static pressure bearing. The pressure-receiving plates are clamped by a connecting member under a load whose value enables the static pressure bearing to function as a spring.

According to an embodiment of the invention, a vibration testing apparatus comprises: a vibrating section having a first portion with a first surface facing in a first direction and a second portion with a second surface facing in a second direction, the first direction being opposite the second direction, a first pressure plate adjacent to the first surface, a second pressure plate adjacent to the second surface, a connecting member connected to the first plate and the second plate, a vibration generator having a vibration table, means for connecting the vibration table to one of the connecting element, the first pressure plate, and the second pressure plate, the means for connecting including means for urging the first plate against the first surface and for urging the second plate against the second surface, means for forcing the first and second plates away from respective ones of the first and second surfaces and the means for forcing including means for pumping a fluid between the first plate and the first surface and for pumping the fluid between the second plate and the second surface.

According to a feature of the invention, a vibration testing apparatus comprises: a vibrating section, means for supporting the vibrating section for vibration in two orthogonal directions, means for generating vibrations along the two orthogonal directions, means for transmitting vibrations to the vibrating section, the means for transmitting including a pair of pressure-receiving plates orthogonal to a direction of vibration, the vibrating section having a pair of oppositely facing pressure-bearing surfaces, each parallel to and adjacent to a respective one of the pair of pressure-receiving plates, at least one channel between each of the pair of pressure-receiving plates and a respective one of the pressure-bearing surfaces, means for feeding the at least one channel with a high pressure fluid, thereby forming a static pressure bearing at the respective one of the pressure-bearing surfaces, each of the static pressure bearings being characterized by a force-displacement curve, a direction of displacement of the force-displacement curve being parallel to the direction of vibration, means for clamping the pair of pressure-receiving plates to the vibrating section under a predetermined load and the predetermined load being set to coincide with a local peak of a gradient of the force-displacement curve.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Figure 6:
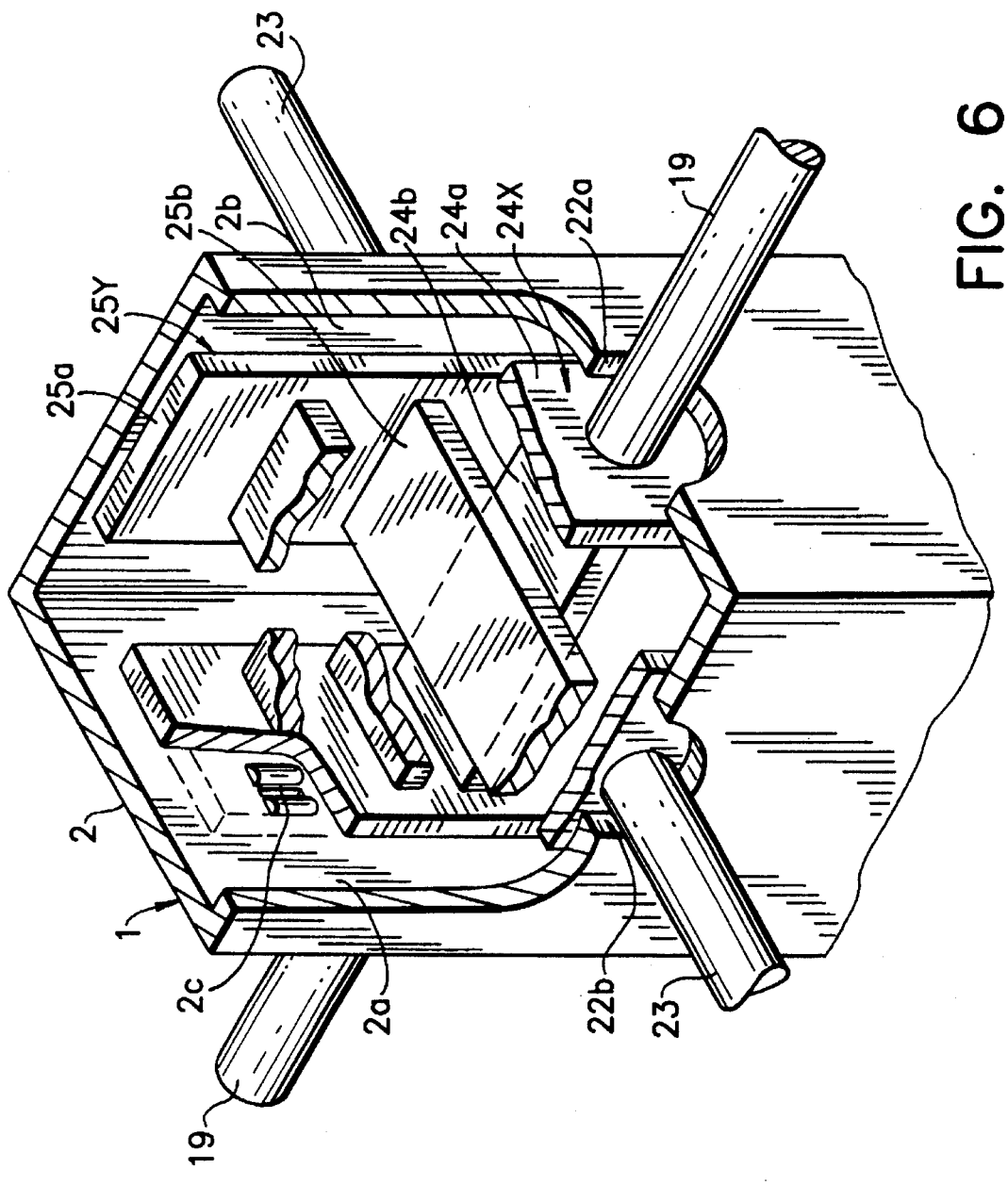
FIG. 6 is a perspective cutaway view of the apparatus of the prior art.
Figure 7:
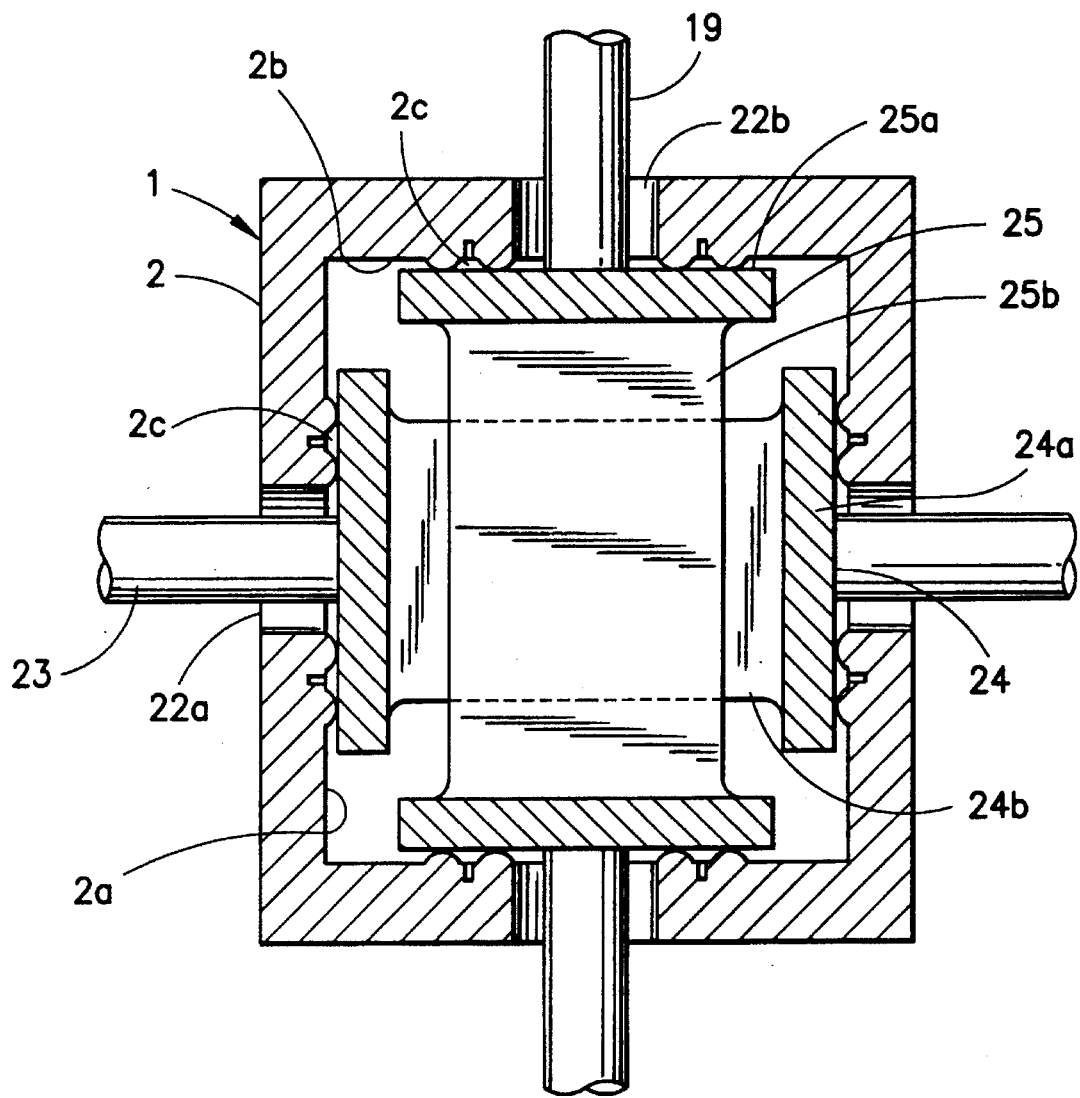
FIG. 7 is a vertical cross-section of the prior-art apparatus of FIG. 6.

Referring to FIGS. 6 and 7, in an example of the prior art, a vibration testing apparatus has a test chamber 1. A case 2 has inside surfaces 2a and 2b in which are formed grooves 2c. Pressure receiving plates 24a and 25a oppose respective ones of grooves 2c. Oil is pumped under pressure through grooves 2c to form static pressure bearings between grooves 2c and respective ones of pressure receiving plates 24a and 25a. Transmission members 19, 23 protrude through openings 22a, 22b in case 2. Vibrational energy is transmitted through transmission members 19, 23 to an X-axis joint 24X, comprising pressure receiving plate 24a and a connecting member 24b, and a Y-axis joint 25Y, comprising pressure receiving plate 25a and a connecting member 25b, respectively.

Figure 4:
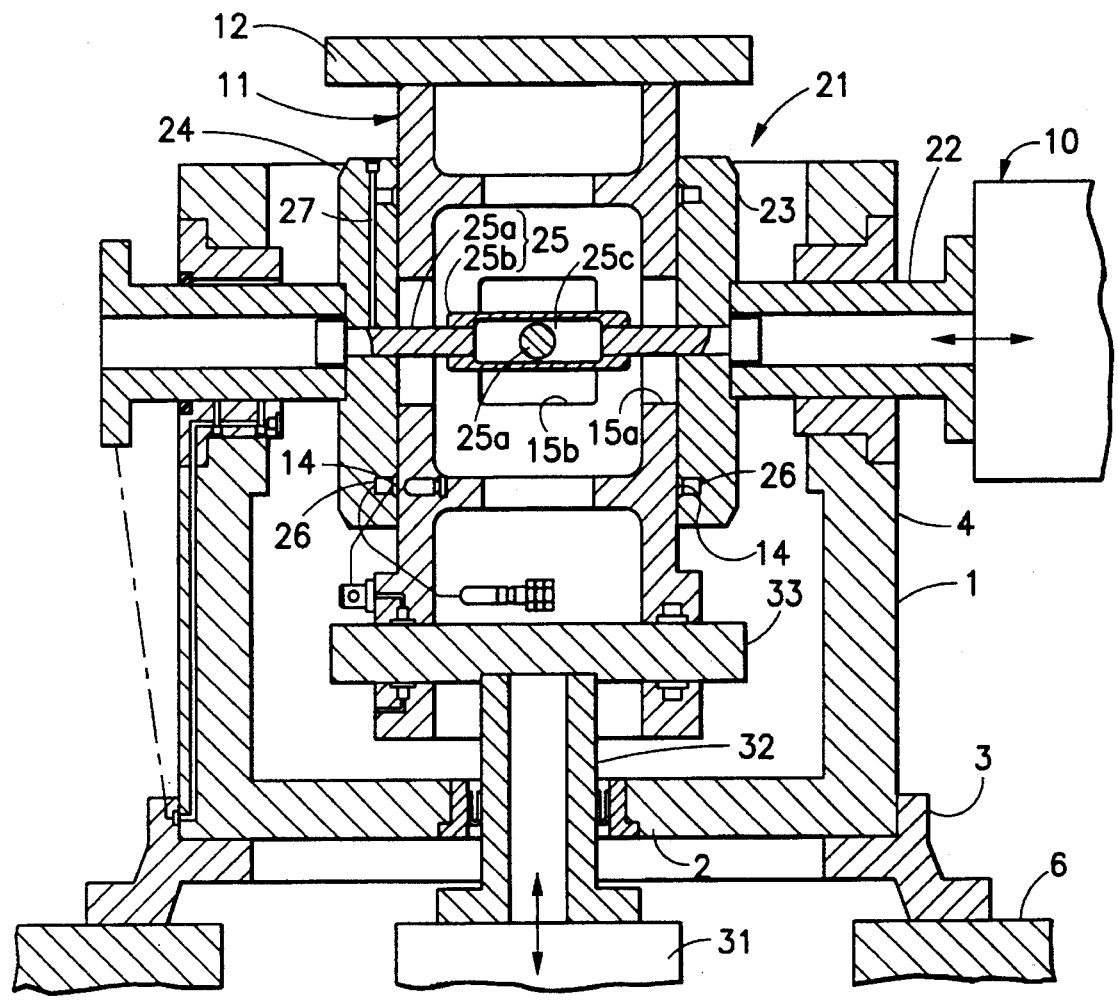
FIG. 4 is a longitudinal sectional view of a first embodiment of the present invention.

Referring to FIG. 4, a vibration testing apparatus of the present invention, capable of vibrating in three axial directions, has a case 1 with a bottom plate 2. Case 1, in the shape of a sleeve with a multi-sided cross section, is fixed to a base 6 through a leg 3 attached to an upper surface of base 6. A vibrating section 11 is housed in case 1. Vibrating section 11 is vibrated in the Z-axis direction by a vertical vibration generator 31 below bottom plate 2. A vertical vibration plate 33 is connected to vertical vibration generator 31 by means of a sleeve member 32 that passes through an ample opening in bottom plate 2. Vertical vibration plate 33 transmits vibration from vertical vibration generator 31 to vibrating section 11 and slidably supports it during motion in the X-axis and Y-axis directions.

A horizontal vibration generator 10, outside case 1, imparts vibration in the X-axis direction to vibrating section 11. A first pressure plate 23 is connected to horizontal vibration generator 10 through a sleeve member 22. A second pressure plate 24 is parallel to first pressure plate 23 on an opposite side of vibrating section 11. The pair of pressure-receiving plates 23 and 24 vibrate vibrating section 11 in the X-direction and support it during sliding movement in the Y- and Z-axis directions. A similar arrangement (not shown) vibrates vibrating section 11 in the Y-axis direction. Thus vibrating section 11 vibrates in all three directions.

Each of horizontal vibration generator 10 and vertical vibration generator 31, though not shown in detail, is the vibration table of a electro-dynamic vibration generator that generates a vibrating force according to Fleming's left-hand rule. Each of horizontal vibration generator 10 and vertical vibration generator 31 may instead be the vibration table of an electro-hydraulic or mechanical vibration generator.

Figure 1:
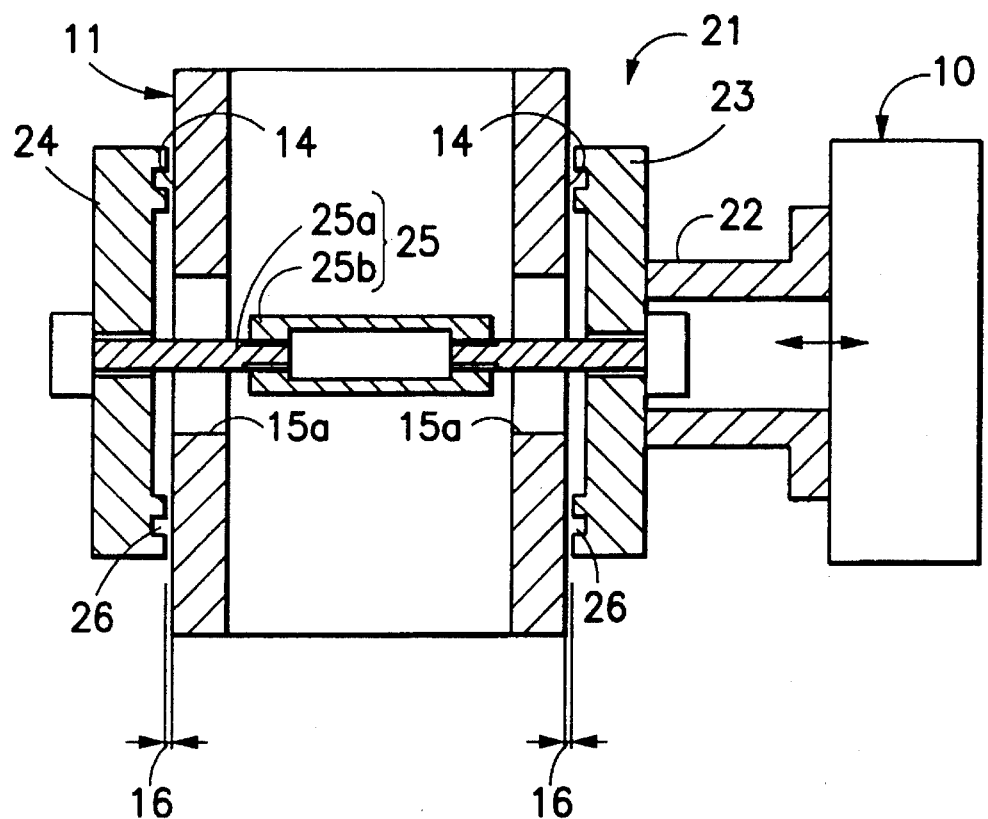
FIG. 1 is a structural cross-section of a vibration testing apparatus according to the present invention.

Referring to FIGS. 1 and 4, the vibration transmission mechanism is described with reference to the X-axis direction only. The vibration transmission mechanism for the Y-axis direction can be identically described.

Vibrating section 11, as described above, is a sleeve with a multi-sided cross section and pressure-bearing surfaces 14 on each side. A tension bolt 25a passes through an opening 15a that is centrally located in each pressure-bearing surface 14. Opening 15a has sufficient clearance to clear the stroke in the X-axis and Z-axis directions. Another opening 15b, quadrangular in shape, has sufficient clearance to clear the stroke in the X-axis and Z-axis directions.

Cylindrical sleeve member 22, first pressure plate 23, second pressure plate 24, tension bolt 25a, and a nut 25b are elements of a transmitting section 21. Cylindrical sleeve member 22 is connected to the vibration table of horizontal vibration generator 10. First pressure plate 23 is, in turn, connected to sleeve member 22 perpendicularly to the direction of vibration. Second pressure plate 24, which is parallel to first pressure plate 23, is connected to first pressure plate 23 through a connecting member 25. Connecting member 25 includes tension bolts 25a and nut 25b. Both members of the pair of pressure-receiving plates 23 and 24 are pulled together by connecting member 25 squeezing vibrating section 11 between them. Pressure is thereby applied to respective pressure-bearing surfaces 14. A small clearance 16 is defined between each pressure plate 23, 24 and its associated pressure-bearing surface 14. The sides of pressure-receiving plates 23 and 24 adjacent pressure-bearing surfaces 14 each have oil pressure pockets 26. High pressure oil is fed into clearances 16 to force pressure-receiving plates 23 and 24 away from their respective adjacent pressure-bearing surfaces 14. Oil pressure pockets 26 are grooves extending in the Y-axis direction and vertically spaced by equal distances from connecting member 25. With high pressure oil fed from oil pockets 26 to clearances 16, pressure-bearing surfaces 14 and pressure-receiving plates 23, 24 constitute a static pressure bearing that supports vibrating section 11 for Y- and Z-axis directions.

Tension bolts 25a pass through oversized openings 15a and connect together through nuts 25b inside vibrating section 11. Opposed pressure-receiving plates 23 and 24 are thus clamped together under a predetermined load. The force exerted by the high pressure oil to widen clearances 16 is balanced by the force clamping pressure-receiving plates 23 and 24. In response to a force acting in the X-axis direction, the static pressure bearing acts as a spring, exerting a pressure in the X-axis direction opposing that force. A similar arrangement applies to vibrations in the Y-axis direction. However, bolt 25a extends in the Y-axis direction through nut 25b with a clearance 25c sufficient to clear the stroke in the X-direction.

Figure 2:
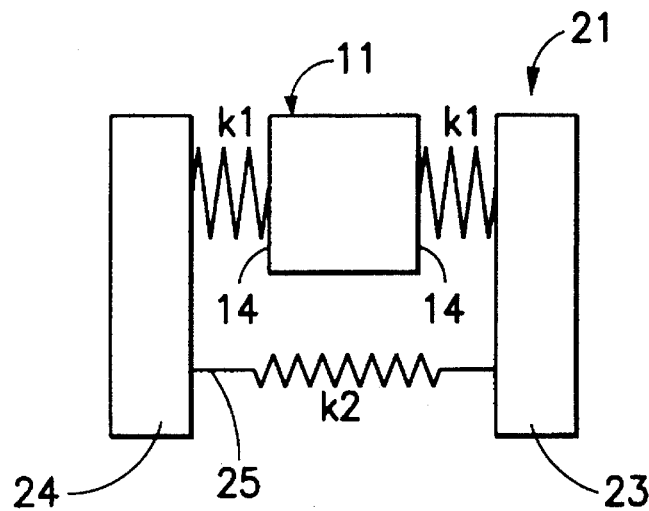
FIG. 2 is an explanatory diagram of the present invention in which are modeled the connections between the vibrating section and the transmitting section.
Figure 3:
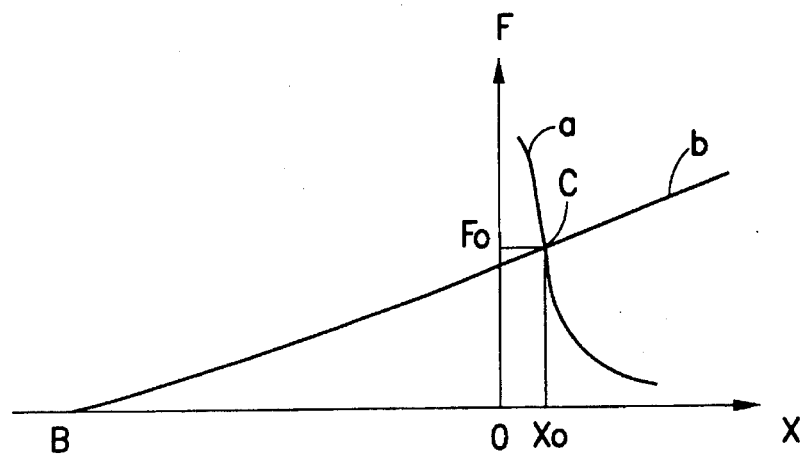
FIG. 3 is a graph that shows the forces acting on the pressure-receiving plates and the connecting members in relation to the clearances.

In the apparatus described above, high-pressure oil is fed via oil pressure pockets 26 to clearances 16. A force exerted by the high-pressure oil acts to widen the clearances, while displacement of pressure plate 23, 24 toward pressure-bearing surface 14 tends to increase a restoring force. FIG. 3 shows the relationship between the restoring force and the displacement of pressure plate 23, 24 toward pressure-bearing surface 14. This force, as shown, may be characterized by a curve a, which has its maximum gradient in the vicinity of a point c. The restoring force is countered by an equal tension in tension bolts 25a. Thus tension bolts 25a are subjected to a tensile force while high-pressure oil is subjected to a compressive force. A relationship between the tensile restoring force of tension bolts 25a and the displacement of pressure plate 23 away from pressure-bearing surface 14 is represented by a straight line b. Line b shows that the extension or contraction of tension bolts 25a is proportional to the restoring force they generate. Assuming the force-displacement characteristics of these two curves are those of a simple linear spring, curve a corresponds to a spring constant k1, and straight line b corresponds to a spring constant k2, as shown in FIG. 2.

To transmit forces from vibration generator 10 to vibrating section 11 with fidelity, the static pressure bearing in transmitting section 21 must be actuated at a working point c. At point c the gradient of the force-displacement curve of the static pressure bearing peaks. This gradient is nearly constant, as in a simple spring, in the region about point c. Modeling the system as a simple spring, as shown in FIG. 2, spring constant k1 is the slope of curve a near point c and spring constant k2 is the slope of straight line b. When connecting member 25 is tightened, pressure-receiving plates 23, 24 are pressed against respective ones of pressure-bearing surfaces 14. The "spring system" comes to equilibrium at a point of intersection shown in FIG. 3. The force exerted by tightening connecting member 25 determines this point of equilibrium of the spring system. As connecting member 25 is tightened, the origin of the force-displacement curve b of connecting member 25 shifts to the left relative to curve a. This causes the point of equilibrium to move up curve b. In order to insure that the system operates at working point c of FIG. 3, it is only necessary to tighten connecting member 25 until the point of equilibrium is at point c. At that point, the load is $F_0$. Even though spring constant k2 of connecting member 25 is lower than spring constant k1 of the pressure bearing, any operating point can be achieved as long as connecting member 25 can exert enough force in tension on pressure-receiving plates 23, 24. By tightening connecting member 25, the operating point of the system can be selected with precision.

Increasing tension in connecting member 25 increases the rigidity of the connection between transmitting section 21 and vibrating section 11. Thus the force of horizontal vibration generator 10 acts on vibrating section 11 through the spring of spring constant k1. The force exerted by connecting member 25 is generated only by its opposition to the force exerted by the fluid bearing. This force is the only one that need be considered in specifying a required strength for connecting member 25. There is no need to base the strength of connecting member 25 on the forces generated by vibration generator 10 acting in the direction of the vibrations.

As described above, the vibration testing apparatus of this embodiment eliminates the need to strengthen connecting member 25 based on the force acting in the direction of the vibrations. Connecting member 25 can therefore be thinned, thus contributing to reductions in the size and weight of the apparatus. Further, the complicated arrangement in which connecting members 25 alternately cross each other inside vibrating section 11, required by the prior art, can also be avoided, thereby facilitating the assembly of the apparatus.

With the prior art device described above, to give spring constant k1 of the static pressure bearing a constant value, it is necessary to fix the length between the opposite surfaces of the hollow portion and to keep the outer sides of the connecting member parallel. It is also necessary to make the individual dimensions absolutely precise. In contrast, in the above embodiment of the present invention, the necessary condition for keeping the static pressure bearing at its maximum spring constant is only that pressure-bearing surfaces 14 and pressure-receiving plates 23, 24 be parallel. By reducing requirements on the apparatus to this simple constraint, its fabrication can be greatly simplified.

Further, the gradient of the force-displacement curve of the static pressure bearing is higher than spring constant k2 of connecting member 25. Therefore, if the size of vibrating section 11 changes with temperature, the length of connecting member 25 will change proportionately. Any resulting change in load $F_0$ due to a change in temperature is sufficiently small that the working point of the static pressure bearing hardly changes. Thus the gradient of the force-displacement curve of the static pressure bearing remains at a maximum regardless of the temperature.

Figure 5:
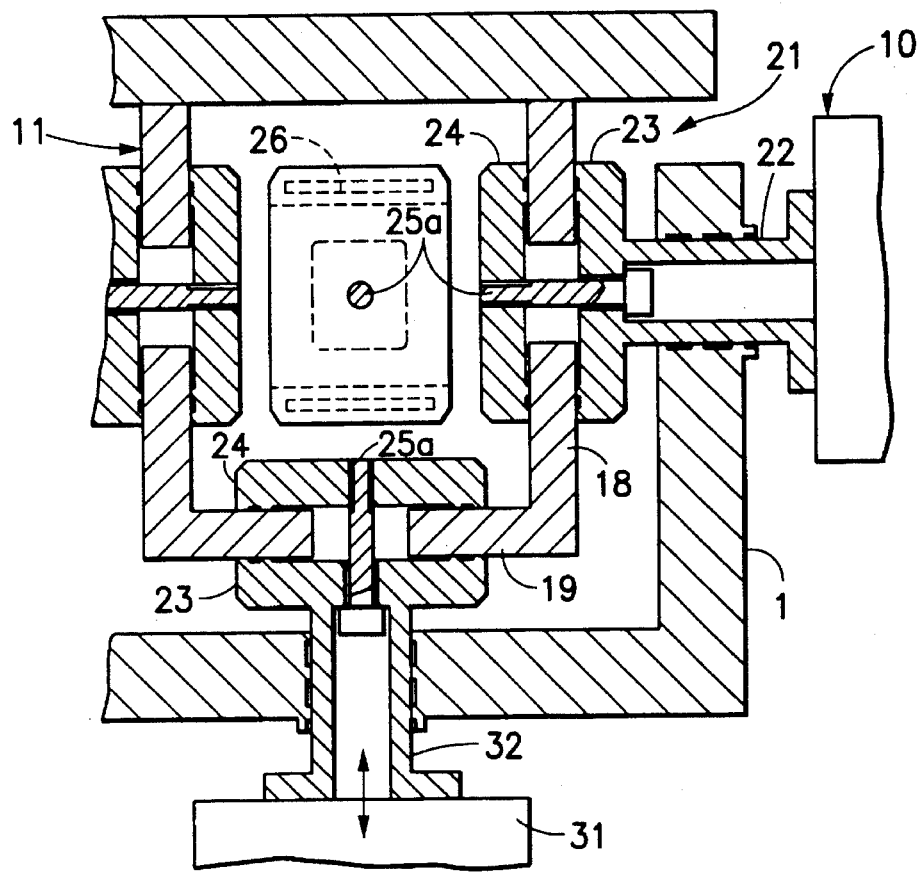
FIG. 5 is a longitudinal sectional view of a second embodiment of the present invention.

Referring to FIG. 5, in a second embodiment of the present invention, for each of the X-, Y-, and Z- axes, first pressure plate 23 is on the outer side of vibrating section 11, parallel and opposed to the outer lateral surface of vibrating section 11. Second pressure plate 24 is on the inner side of vibrating section 11, opposed to first pressure plate 23, with a lateral wall 18 or a bottom wall 19 of vibrating section 11 interposed between the two pressure-receiving plates. The pair of pressure-receiving plates 23 and 24 is clamped by tension bolt 25a. It is clear that the same functionality and advantages as in the first embodiment can be obtained in this embodiment.

In the vibration testing apparatus of the first embodiment of the present invention, since there is no need to consider the force acting in the direction of the vibrations in determining the strength of connecting member 25, the connecting member can be made small, making it possible to minimize the size and weight of the apparatus. Further, since construction of the apparatus is not complicated, as it is in the conventional apparatus, the apparatus can be easily assembled. Further, the rigidity of the static pressure bearing can be improved, and so can the vibration characteristics of the system.

In a vibration testing apparatus of the second embodiment of the present invention, vibrations from the vibration generator can be transmitted to the vibrating section with greater fidelity.

If vibration testing devices are constructed in the manner described above, they can be still further simplified in their arrangement.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vibration testing apparatus comprising:

a vibrating section having a first portion with a first surface facing in a first direction and a second portion with a second surface facing in a second direction;

said first direction being opposite to said second direction;

a first pressure plate adjacent to said first surface;

a second pressure plate adjacent to said second surface;

a connecting member connected to said first pressure plate and said second pressure plate;

a vibration generator;

means for connecting said vibration generator to said connecting member, said first pressure plate, and said second pressure plate;

said means for connecting including means for urging said first pressure plate against said first surface and for urging said second pressure plate against said second surface;

means for forcing said first and second pressure plates away from respective ones of said first and second surfaces; and said means for forcing including means for pumping a fluid between said first pressure plate and said first surface and for pumping said fluid between said second pressure plate and said second surface.

2. Apparatus as in claim 1, wherein:

said means for connecting includes means for adjusting a first force by which said first pressure plate is urged against said first surface; and said means for connecting further includes means for adjusting a second force by which said second pressure plate is urged against said second surface.

3. Apparatus as in claim 2, wherein said means for connecting includes means for adjusting said first force to be equal to said second force.

4. Apparatus as in claim 3, wherein:

said first portion has a first opening;

said second portion has a second opening; and said connecting member passes through said first and second openings.

5. Apparatus as in claim 4, further comprising:

means for vibrating said vibration section in a third direction perpendicular to said first and second directions; and said first and second openings being sized to provide clearances between said connecting member and said first and second portions when said vibration section is vibrated in said third direction.

6. A vibration testing apparatus comprising:

a vibrating section;

means for supporting said vibrating section for vibration in two horizontal orthogonal directions;

means for generating vibrations along said two horizontal orthogonal directions;

means for transmitting vibrations to said vibrating section;

said means for transmitting including a pair of pressure-receiving plates orthogonal to said two horizontal orthogonal directions;

said vibrating section having a pair of oppositely facing pressure-receiving surfaces, each of said pressure-receiving surfaces being parallel to and adjacent to a respective one of said pair of pressure-receiving plates;

at least one channel between each of said pair of pressure-receiving plates and a respective one of said pressure-receiving surfaces;

means for feeding said at least one channel with a high pressure fluid, thereby forming a static pressure bearing at said respective one of said pressure-receiving surfaces;

each of said static pressure bearings being characterized by a force-displacement curve;

a direction of displacement of said force-displacement curve being parallel to said direction of vibration;

means for clamping said pair of pressure-receiving plates to said vibrating section under a predetermined load; and said predetermined load being set to coincide with a local peak of a gradient of said force-displacement curve.

7. A vibration testing apparatus as in claim 6, wherein said pair of pressure-receiving plates are clamped by a connecting member having a spring constant that is lower in magnitude than said local peak.

8. A vibration testing apparatus as in claim 6, wherein:

said vibrating section has a vertical portion with an open interior and opposite sides;

said vertical portion has a rectangular cross-section;

said pressure-receiving surfaces are located on said opposite sides of said vertical portion;

said vibrating section has two holes in said vertical portion, each of which perforates a respective one of said pressure-receiving surfaces;

said means for clamping includes a connecting member extending through said holes;

said connecting member is coupled at opposite ends thereof to said pair of pressure-receiving plates; and means for connecting one of said pair of pressure-receiving plates to a vibration generator.

9. A vibration testing apparatus as in claim 7, wherein:

said connecting member includes at least one tension bolt and at least one nut;

said connecting member includes means for selecting a clamping force of said means for clamping; and said clamping force is responsive to a rotation of said nut.

10. A vibration testing apparatus as in claim 6, wherein:

said vibrating section has a vertical portion with an open interior and a wall;

said wall is adjacent to said interior;

said pressure-receiving surfaces are on opposite sides of said wall;

said wall has a hole;

said means for clamping includes a connecting member connected at opposite ends thereof to said pair of pressure-receiving plates;

said connecting member has opposite ends;

said connecting member includes means for connecting each of said opposite ends to a respective one of said pair of pressure-receiving plates; and said connecting member extends through said hole.

11. A vibration testing apparatus as in claim 10, wherein said connecting member includes a tension bolt.

12. A vibration testing apparatus as in claim 11, further comprising:

means for vibrating said vibrating section in a vertical direction;

means for supporting said vibrating section for vibration in said vertical direction; and said means for supporting including means for permitting a horizontal movement of said vibrating section.

13. A vibration testing apparatus as in claim 6, further comprising:

means for vibrating said vibrating section in a vertical direction;

means for supporting said vibrating section for vibration in said vertical direction; and said means for supporting including means for permitting a horizontal movement of said vibrating section.

* * * * *